United States Patent
Yamada

(10) Patent No.: US 8,503,822 B2
(45) Date of Patent: Aug. 6, 2013

(54) IMAGE QUALITY EVALUATION SYSTEM, METHOD, AND PROGRAM UTILIZING INCREASED DIFFERENCE WEIGHTING OF AN AREA OF FOCUS

(75) Inventor: Toru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 306 days.

(21) Appl. No.: 12/922,817

(22) PCT Filed: Apr. 28, 2009

(86) PCT No.: PCT/JP2009/058385
§ 371 (c)(1),
(2), (4) Date: Sep. 15, 2010

(87) PCT Pub. No.: WO2009/133900
PCT Pub. Date: Nov. 5, 2009

(65) Prior Publication Data
US 2011/0013830 A1  Jan. 20, 2011

(30) Foreign Application Priority Data
Apr. 30, 2008  (JP) ................................ 2008-118349

(51) Int. Cl.
*G06K 9/64*  (2006.01)
(52) U.S. Cl.
USPC ........................................................ 382/278
(58) Field of Classification Search
None
See application file for complete search history.

(56) References Cited

U.S. PATENT DOCUMENTS

| | | |
|---|---|---|
| 6,239,834 B1 | 5/2001 | Miyaji et al. |
| 6,678,424 B1 | 1/2004 | Ferguson |
| 2004/0183950 A1 | 9/2004 | Sugimoto et al. |

FOREIGN PATENT DOCUMENTS

| | | |
|---|---|---|
| JP | 09-307930 A | 11/1997 |
| JP | 3458600 B2 | 11/1997 |
| JP | 2001-197527 A | 7/2001 |
| JP | 2004-260602 A | 9/2004 |

OTHER PUBLICATIONS

Lu et al., "Modeling Visual Attention's Modularity Aftereffects on Visual Sensitivity and Quality Evaluation," IEEE Transactions on Image Processing, vol. 14, No. 11, Nov. 2005.*
Wong et al., "A robust scheme for live detection of human faces in color images," Signal Processing: Image Communication 18, pp. 103-114, 2003.*
Wark and Sridharan, "A Syntactic Approach to Automatic Lip Feature Extraction for Speaker Identification," In ICASSP, pp. 3693-3696, 1998.*
Chai and Ngan, "Face Segmentation Using Skin-Color Map in Videophone Applications," IEEE Transactions on Circuits and Systems for Video Technology, vol. 9, No. 4, Jun. 1999.*

(Continued)

*Primary Examiner* — Barry Drennan
*Assistant Examiner* — Andrew Moyer
(74) *Attorney, Agent, or Firm* — Sughrue Mion, PLLC

(57) ABSTRACT

Disclosed is a picture quality evaluation system. The system calculates the difference between data that represent a feature value of a pixel set that constitutes a first image and data that represent a feature value of a pixel set that constitutes a second image. The system then uses at least the first image or the second image to determine the main area of focus of an image that has a specific feature and then calculates the main area of focus. The system then weights the difference in the feature value in the pixel set contained in the main area of focus and calculates the picture quality value of the first image, based on the weighted difference.

24 Claims, 6 Drawing Sheets

OTHER PUBLICATIONS

Lee et al., "Foveated Video Quality Assessment," IEEE Transactions on Multimedia, vol. 4, No. 1, Mar. 2002.*

Cavallaro and Winkler, "Segmentation-Driven Perceptual Quality Metrics," 2004 International Conference on Image Processing (ICIP), 2004.*

Winkler, "A Perceptual Distortion Metric for Digital Color Video," IS&T/SPIE Conference on Human Vision and Electronic Imaging IV, SPIE vol. 3644, Jan. 1999.*

Kakumanu et al., "A survey of skin-modeling and detection methods," Pattern Recognition 40, pp. 1106-1122, 2007.*

* cited by examiner

☐ PIXEL GROUP OF INTEREST FOR DECISION

▦ VICINAL PIXEL GROUPS

IMAGE QUALITY EVALUATION SYSTEM, METHOD, AND PROGRAM UTILIZING INCREASED DIFFERENCE WEIGHTING OF AN AREA OF FOCUS

CROSS REFERENCE TO RELATED APPLICATIONS

This application is a National Stage of International Application No. PCT/JP2009/058385, filed on Apr. 28, 2009, which claims priority from Japanese Patent Application No. 2008-118349, filed on Apr. 30, 2008, the contents of all of which are incorporated herein by reference in their entirety.

TECHNICAL FIELD

The present invention relates to image quality evaluation system, method and program.

BACKGROUND ART

Methods of objectively evaluating image quality of image data transmitted via a network (which will be referred to as an image hereinbelow) or coded images include methods of using the absolute difference, squared difference, and S/N ratio of pixel values (luminances, color differences, RGB values, etc.) between an original image and an image of interest for evaluation. In the methods, however, a difference between two images is directly reflected on the objective image quality value without taking account of human visual properties, and therefore, there has been a problem that the correlation with a result of subjective evaluation made by a person via visual evaluation is low.

A method relating to the problem is disclosed in Patent Document 1. The image quality evaluation method as disclosed in Patent Document 1 improves the correlation with the subjective evaluation value by applying weighting to the absolute difference, squared difference, S/N ratio or the like as described above based on the power of the alternating-current (AC) components for pixel values while taking account of human visual properties varying with the spatial frequency. It is known that a human visual property is insensitive to signals of higher frequency, and weighting is controlled according to the amount of signals of higher frequency contained in an image.

Patent Document 1: JP-3458600B2

DISCLOSURE OF THE INVENTION

Problems to be Solved by the Invention

The image quality evaluation method disclosed in Patent Document 1, however, poses a problem that it may still give a low correlation with a result of subjective evaluation. For example, it is known that in a result of subjective evaluation, quality degradation is detected more easily in a video area upon which a person is likely to focus (which will be referred to as a focused area hereinbelow) than in other video areas. However, the method disclosed in Patent Document 1 does not take account of whether an area is a focused area. Hence, a focused area may be evaluated to be less degraded when the area contains a larger amount of high-frequency signals. On the other hand, areas other than the focused area may be evaluated to be more degraded when the areas have a smaller amount of high-frequency signals.

Thus, the present invention has been made in view of such a problem, and its object is to provide image quality evaluation system, method and program with which a higher correlation with a result of subjective evaluation can be obtained.

Means for Solving the Problems

The present invention for solving the aforementioned problem is an image quality evaluation system, characterized in comprising: a difference calculating section for calculating a difference between data representing a feature of a pixel group comprised of at least one pixel making up a first image, and data representing a feature of a pixel group comprised of at least one pixel making up a second image; a degree-of-focused-area calculating section for using at least one of said first and second images to decide a focused area in the image having a predetermined feature, and calculating a degree of focused area indicating the degree of being said focused area; a difference weighting section for applying weighting to the difference in feature for a pixel group falling within said focused area based on said degree of focused area; and an image quality value calculating section for calculating an image quality value for said first image based on the difference weighted by said difference weighting section.

The present invention for solving the aforementioned problem is an image quality evaluation method, characterized in comprising: calculating a difference between data representing a feature of a pixel group comprised of at least one pixel making up a first image, and data representing a feature of a pixel group comprised of at least one pixel making up a second image; using at least one of said first and second images to decide a focused area in the image having a predetermined feature, and calculating a degree of focused area indicating the degree of being said focused area; applying weighting to the difference in feature for a pixel group falling within said focused area based on said degree of focused area; and calculating an image quality value for said first image based on said weighted difference.

The present invention for solving the aforementioned problem is a program, characterized in causing an information processing apparatus to execute the processing of: calculating a difference between data representing a feature of a pixel group comprised of at least one pixel making up a first image, and data representing a feature of a pixel group comprised of at least one pixel making up a second image; using at least one of said first and second images to decide a focused area in the image having a predetermined feature, and calculating a degree of focused area indicating the degree of being said focused area; applying weighting to the difference in feature for a pixel group falling within said focused area based on said degree of focused area; and calculating an image quality value for said first image based on said weighted difference.

Effects of the Invention

The present invention provides a result of image quality evaluation having a higher correlation with a result of subjective evaluation.

EXPLANATION OF SYMBOLS

101 Difference calculating section
102 Degree-of-focused-area calculating section
103 Difference weighting section
104 Image quality value calculating section

BEST MODES FOR CARRYING OUT THE INVENTION

First Embodiment

A first embodiment of the present invention will now be described in detail with reference to the accompanying drawings.

Figure 1:
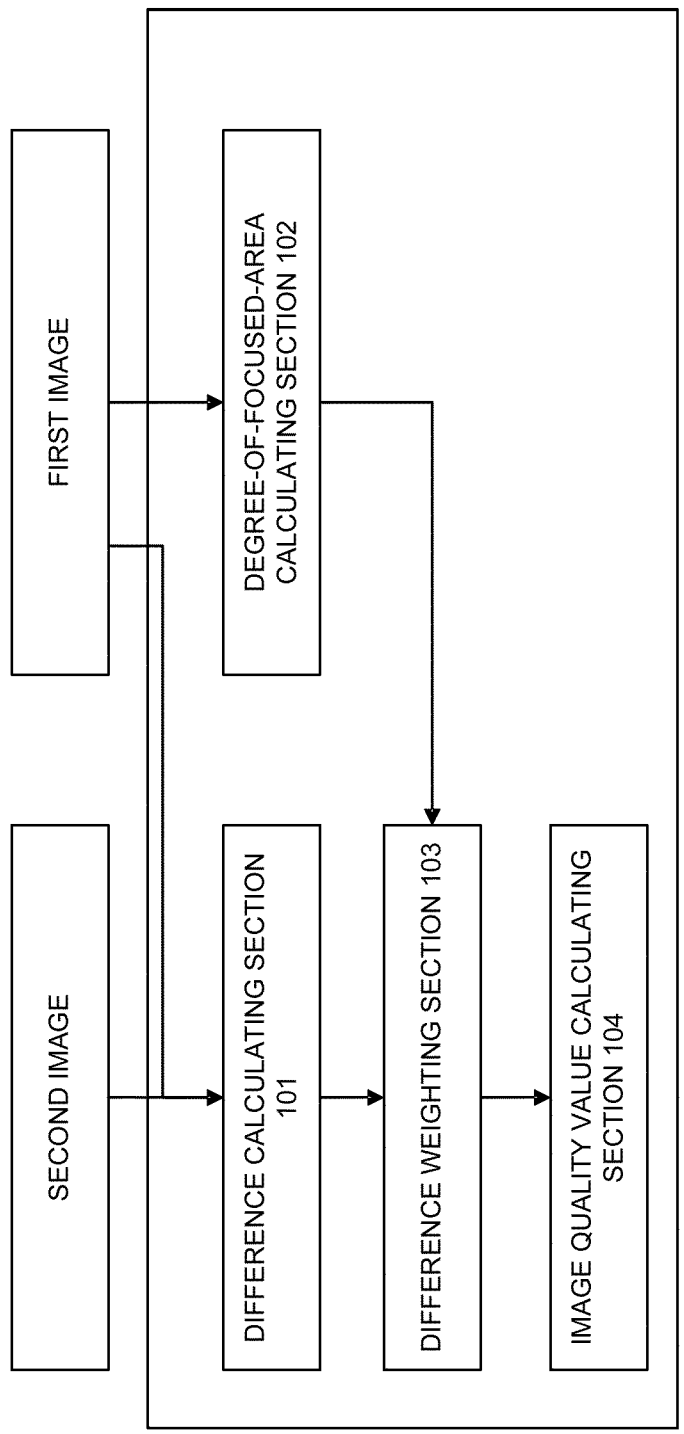
FIG. 1 is a block diagram showing a configuration of a first embodiment of the present invention.

Referring to FIG. 1, an image evaluation system in the first embodiment of the present invention is comprised of a difference calculating section 101, a degree-of-focused-area calculating section 102, a difference weighting section 103, and an image quality value calculating section 104.

The difference calculating section 101 is supplied as input with data representing a feature of a first image, which is an image of interest for evaluation, and data representing a feature of a second image, which is an original image for use as a control for comparison, for each group of pixels comprised of at least one pixel (which will be referred to as a pixel group hereinbelow). It should be noted that the first and second images may be moving pictures or still images.

In the present invention, a pixel group refers to a group of pixels comprised of at least one pixel, and is a concept encompassing not only a group of a plurality of pixels but also a group containing only one pixel. An example of a pixel group having a plurality of pixels may be a block of 16 by 16 pixels.

An example of data representing a feature may be a pixel value of a pixel when the pixel group contains one pixel. The pixel value refers to, for example, information on the luminance value, color difference value or RGB value, or a combination thereof.

Another example of data representing a feature may be an average of pixel values of pixels within a pixel group when the pixel group is a group of a plurality of pixels. Besides, the data representing a feature may be a statistical quantity of AC components for a pixel group, which may be, for example, an average of absolute differences obtained by calculating an average of pixel values of pixels within a pixel group, and calculating an absolute difference between that average and a pixel value of each pixel within the pixel group to determine the average of the absolute differences, or may be a variance of pixel values within the pixel group. Moreover, the data representing a feature may be a transform factor after applying orthogonal transform to pixel values in a pixel group. While the feature corresponding to a pixel group may be input to the difference calculating section 101 as described above when the pixel group is a group of a plurality of pixels, a configuration in which pixel values of pixels in a pixel group are input to the difference calculating section 101 and a feature is calculated on a pixel group-by-pixel group basis as described above at the difference calculating section 101 may be contemplated.

The difference calculating section 101 calculates a differential value in feature between the data representing the feature for the first image and that representing the feature for the second image. For example, in a case that the first and second images are moving picture data, data representing a feature input to the difference calculating section 101 is a feature of a pixel group in each frame in the moving picture. The differential value is calculated as an absolute value of a difference or a squared difference between, for example, a feature of a pixel group at a position in a frame in the first image and that of a pixel group at the same position and in a frame at the same time as those of the first image, in the second image.

It should be noted that the data representing a feature for the first image or that representing a feature for the second image is not always the feature of all pixel groups within the image. For example, when image transmission in a network is involved, values for only part of pixel groups within an image can be acquired due to transmission errors or the like in some cases. In other cases, to reduce the transmission load, the feature of only part of pixel groups within an image is transmitted in the first place, for example, in a case that data representing a feature for the second image is transmitted for every other pixel group. In such cases, a differential value is calculated for the feature of a pixel group only in the frame and at the position that can be referred to by both the first and second images.

The degree-of-focused-area calculating section 102 is supplied with pixel values of at least part of pixels in the first image as input. Although not shown in FIG. 1, pixel values of at least part of pixels in the second image may be supplied as input. Moreover, pixel values of at least part of pixels in the first and second images may be supplied as input, as described earlier. In this case, respective degrees of focused area, which will be discussed later, are calculated for the first and second images, and the average thereof may be regarded as the degree of focused area for the current pixel.

The degree-of-focused-area calculating section 102 identifies a focused area that has a predetermined feature within an image, and calculates a degree of focused area indicating the degree of being a focused area.

As used herein, the predetermined feature refers to, for example, a specific color or a specific shape (for example, characters, a face, or a specific building). The focused area is an area having such a feature in an image.

In identifying a focused area, first, a pixel value is looked up on a pixel-by-pixel basis, and a degree of pixel of interest indicating a degree of how much the current pixel is a pixel of interest having the predetermined feature is calculated. As an example, a pixel having a color that resembles a human skin is defined as pixel of interest. In particular, decision is made as to whether an input pixel is a pixel of interest depending upon whether the pixel value of the pixel falls within a specific range in a color space. Examples of the color spaces include a YCbCr color space that is represented by luminance value and color difference values, and an RGB color space represented by RGB values indicating three primary colors, red, blue and green. It should be noted that definition of a pixel of interest is not limited to a color that resembles a human skin, and may be another definition. For example, in a case that the YCbCr color space is employed, values of the luminance Y, blue color difference Cb, and red color difference Cr for each pixel are input as a pixel value to the degree-of-focused-area calculating section 102.

Moreover, in a case that the pixel value of an input pixel has a specific color, the current pixel of interest is decided to be a pixel of interest. In general, a person tends to focus upon a human figure appearing in an image, so that a color that resembles a human skin color is defined as the specific color. In particular, the specific color is defined as such a range in a YCbCr color space that covers a whole range in an RGB space containing a color recognized to resemble a skin color via subjective experimentation (visual evaluation) as represented in the RGB color space. Therefore, a range broader than the skin color in RGB representation satisfies the definition. In a case that the luminance Y ranges $48 \leq y \leq 224$, blue difference Cb ranges $104 < Cb < 125$, and red difference Cr ranges $135 < Cr < 171$ according to subjective experimentation as described above, it is considered that the color resembles a human skin color and that pixel is decided to be a pixel of interest. The range of pixel values is not limited to the range of values described above, and may include other values.

Next, based on a result of the decision as to whether each pixel is a pixel of interest, the degree of pixel of interest for the pixel that is a pixel of interest is defined as one, and that for the pixel that is not a pixel of interest is defined as zero. It should be noted that the degree of pixel of interest is not limited to only zero and one, which is based upon whether a current pixel is a pixel of interest or not, and it may be a continuous or multi-step value. For example, a method of defining a value obtained by normalizing the distance from a specific point in the YCbCr color space as the degree of pixel of interest may be contemplated.

Next, a focused area is identified based on the calculated degree of pixel of interest, and a degree of focused area for the focused area is calculated. A method of calculating the degree of focused area involves defining a set of pixels having a degree of pixel of interest of one as a focused area, defining a degree of focused area for pixels within the area as one, and defining a degree of focused area for pixels outside the area as zero. It should be noted that in a case that the degree of pixel of interest is defined as a continuous or multi-step value, the method may involve comparing the degree of pixel of interest with a predefined threshold, defining a set of pixels having a degree of pixel of interest higher than the predefined threshold as a focused area, and defining the degree of focused area of pixels within the focused area as one.

The degree of focused area may also be a continuous or multi-step value, and for example, in a case that the degree of pixel of interest is defined as a continuous or multi-step value, and a set of pixels having a higher degree of pixel of interest than a predefined threshold is defined as a focused area, the degree of focused area may be defined as a continuous or multi-step value in proportion with the total or average of the degree of pixel of interest for pixels contained in the focused area. Moreover, a pixel having a degree of focused area of zero near a pixel having a degree of focused area of non-zero may be redefined to have a degree of focused area of non-zero. This is done by taking account of the fact that while a person watches a focused area, pixels near the area come into sight.

The difference weighting section 103 uses the degree of focused area calculated at the degree-of-focused-area calculating section 102 to apply weighting to the differential value for a pixel group falling within the focused area, and outputs a weighted differential value.

In applying weighting to the differential value for a pixel group, a differential value for a pixel group containing pixels having a degree of focused area of one is multiplied by A, and that for a pixel group containing pixels having a degree of focused area of zero is multiplied by B. A, B are weighting factors, where A>B. For example, processing is executed such that a differential value for a pixel group containing pixels having a degree of focused area of one is multiplied by two, and that for a pixel group containing pixels having a degree of focused area of zero is multiplied by one. As another example, in a case that the degree of focused area for each pixel is calculated as a continuous value, the weighting factor may be defined such that (weighting factor)=1+(degree of focused area), or the like.

In a case that a pixel group is comprised of a plurality of pixels, part of the pixel group may not fall within a focused area. In such a case, a decision is made as to whether a pixel group falls within a focused area according to a proportion of the area of the pixel group falling within the focused area, and in a case that the pixel group is regarded as within the focused area, those pixels falling outside the focused area are also regarded as within the focused area and weighting is applied thereto using the weighting factor similar to that described above.

The image quality value calculating section 104 outputs an image quality value for evaluating image quality of the first image based on the differential value weighted by the difference weighting section 103. The image quality value is calculated in the form of, for example, an average of weighted differential values of the whole first image. The image quality value to be output may be output directly as an average, or converted into another form such as the S/N ratio and then output.

Figure 2:
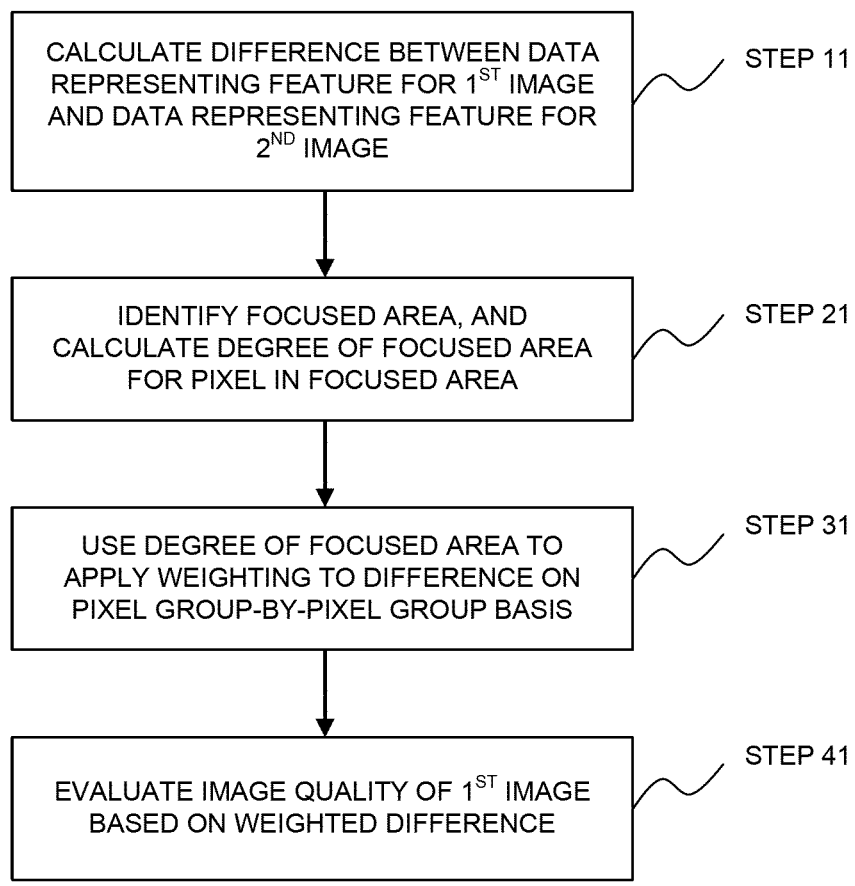
FIG. 2 is a flow chart for explaining an operation of the first embodiment of the present invention.

Next, an operation in this embodiment will be described with reference to FIG. 2.

At Step 11, a difference between data representing a feature for a first image and data representing a feature for a second image is calculated.

At Step 21, a focused area is identified, and a degree of focused area for a pixel in the focused area is calculated.

At Step 31, the degree of focused area calculated at Step 21 is used to apply weighting to the difference calculated at Step 11 for each pixel group described above.

At Step 41, an image quality value for the first image is calculated based on the difference weighted at Step 31 to evaluate the first image.

It should be noted that Steps 11 and 21 may be run in a temporally reverse order, or in parallel.

The first embodiment can produce a result of image quality evaluation having a higher correlation with a result of subjective evaluation. The reason of this is that image quality evaluation is made while taking account of whether an area is a focused area that is focused by a person by calculating the degree of focused area. Especially, by defining a color resembling a human skin as the focused area, the degree of focused area can be calculated to have a high correlation with a degree of actual focusing by a person. This is because a person generally tends to focus upon a human figure in a video, if present.

Second Embodiment

A second embodiment of the present invention will now be described in detail with reference to the accompanying drawings.

The second embodiment will address a case in which a pixel group is comprised of one pixel.

Figure 3:
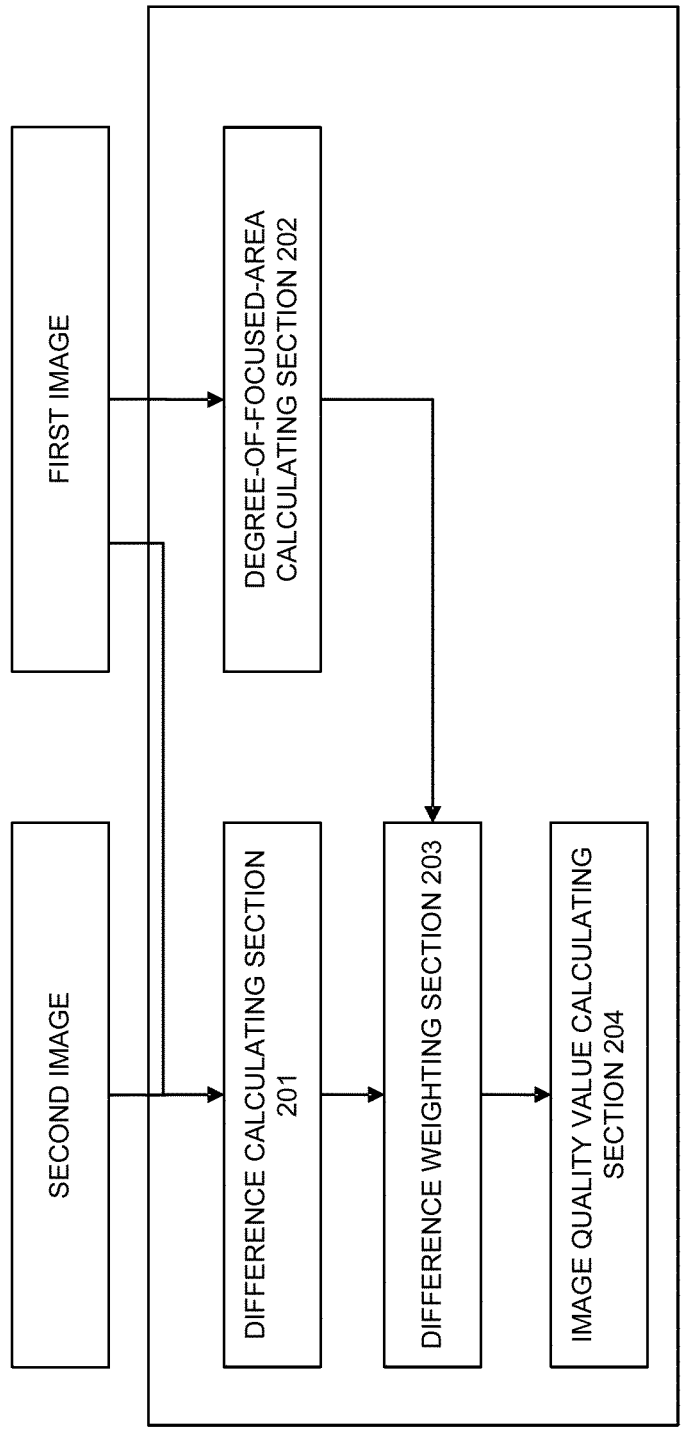
FIG. 3 is a block diagram showing a configuration of a second embodiment of the present invention.

Referring to FIG. 3, an image evaluation system in the second embodiment of the present invention is comprised of a difference calculating section 201, a degree-of-focused-area calculating section 202, a difference weighting section 203, and an image quality value calculating section 204.

The difference calculating section 201 is supplied as input with data representing a feature of a first image, which is an image of interest for evaluation, and data representing a feature of a second image, which is an original image for use as a control for comparison, on a pixel-by-pixel basis. An example of data representing a feature is a pixel value of a pixel when the pixel group contains one pixel. The pixel value refers to, for example, information on the luminance value, color difference value or RGB value, or a combination thereof.

The difference calculating section 201 calculates a differential value between the data representing a feature for the first image and that representing a feature for the second image. For example, in a case that the first and second images are moving picture data, data representing a feature input to the difference calculating section 101 is a pixel value of each pixel in each frame in the moving picture. In this case, the differential value is calculated as an absolute value of a difference or a squared difference between a pixel value of a pixel at a position in a frame in the first image and that of a pixel at the same position and in a frame at the same time as those of the first image, in the second image.

It should be noted that the data representing a feature for the first image or that representing a feature for the second image is not always the pixel value of all pixels within the image. For example, when image transmission in a network is involved, values for only part of pixel groups within an image can be acquired due to transmission errors or the like in some cases. In other cases, to reduce the transmission load, only part of pixel values within an image is transmitted in the first place, for example, in a case that data representing a feature for the second image is transmitted for every other pixel. In such cases, a differential value is calculated only in the frame and at the position that can be referred to by both the first and second images.

The degree-of-focused-area calculating section 202 calculates a degree of focused area indicating the degree of being a focused area. Since in this embodiment, a pixel group contains one pixel, the following description will be made considering the degree of pixel of interest in the first embodiment described above directly as the degree of focused area.

The degree-of-focused-area calculating section 202 first decides whether a pixel is a pixel of interest for a focused area from the input pixel value.

In this embodiment, as an example, a pixel having a color that resembles a human skin is defined as pixel of interest. In particular, decision is made as to whether an input pixel is a pixel of interest depending upon whether the pixel value of the pixel falls within a specific range in a color space. Examples of the color spaces include a YCbCr color space that is represented by luminance value and color difference values, and an RGB color space represented by RGB values indicating three primary colors, red, blue and green. It should be noted that definition of a pixel of interest is not limited to a color that resembles a human skin, and may be another definition. For example, in a case that the YCbCr color space is employed, values of the luminance Y, blue color difference Cb, and red color difference Cr for each pixel are input as a pixel value to the degree-of-focused-area calculating section 202.

Moreover, in a case that the pixel value of an input pixel has a specific color, the current pixel of interest is decided to be a focused area. In general, a person tends to focus upon a human figure appearing in a video, so that a color that resembles a human skin color is defined as the specific color. In particular, the specific color is defined as such a range in a YCbCr color space that covers a whole range in an RGB space containing a color recognized to resemble a skin color via subjective experimentation (visual evaluation) as represented in the RGB color space. Therefore, a range broader than the skin color in RGB representation satisfies the definition. In a case that the luminance Y ranges $48 \leqq y \leqq 224$, blue difference Cb ranges $104 < Cb < 125$, and red difference Cr ranges $135 < Cr < 171$ according to subjective experimentation as described above, it is considered that the color resembles a human skin color and that pixel is decided to be a pixel of interest. The range of pixel values is not limited to the range of values described above, and may include other values.

Next, based on a result of the decision as to whether each pixel is a pixel of interest, the degree of focused area for the pixel is calculated and output. For example, the degree of focused area for the pixel that is a pixel of interest is defined as one, and that for the pixel that is not a pixel of interest is defined as zero. It should be noted that the degree of focused area may be a continuous or multi-step value, instead of zero and one as described above. Besides, the degree of focused area for a pixel lying near the pixel of interest may be defined as 0.5. This is done by taking account of the fact that while a person watches a focused area, pixels near the pixel come into sight.

Moreover, the decision of a pixel of interest is not limited to that relying upon the aforementioned method, and may rely upon another method by, for example, detecting a viewer's line of sight.

The difference weighting section 203 uses the degree of focused area calculated at the degree-of-focused-area calculating section 202 to apply weighting to the differential value calculated at the difference calculating section 101 on a pixel-by-pixel basis, and outputs a weighted differential value.

Now an example of weighting when the degree of focused area is calculated to have a value of 0, 1 for each pixel at the degree-of-focused-area calculating section 202 will be described. A differential value of a pixel calculated to have a degree of focused area of one is multiplied by A, and that of a pixel calculated to have a degree of focused area of zero is multiplied by B. A, B are weighting factors, where A>B. For example, processing is executed such that a differential value of a pixel calculated to have a degree of focused area of one is multiplied by two, and that of a pixel calculated to have a degree of focused area of one is multiplied by one.

As another example, in a case that the degree of focused area for each pixel is calculated as a continuous value, the weighting factor may be defined such that (weighting factor) =1+(degree of focused area).

The image quality value calculating section 204 outputs an image quality value for evaluating image quality of the first image based on the differential value weighted by the difference weighting section 203. The image quality value is calculated in the form of, for example, an average of weighted differential values for the whole first image. The image quality evaluation value to be output may be output directly as an average, or converted into another form such as the S/N ratio and then output.

Third Embodiment

Next, a third embodiment of the present invention will now be described in detail.

Figure 4:
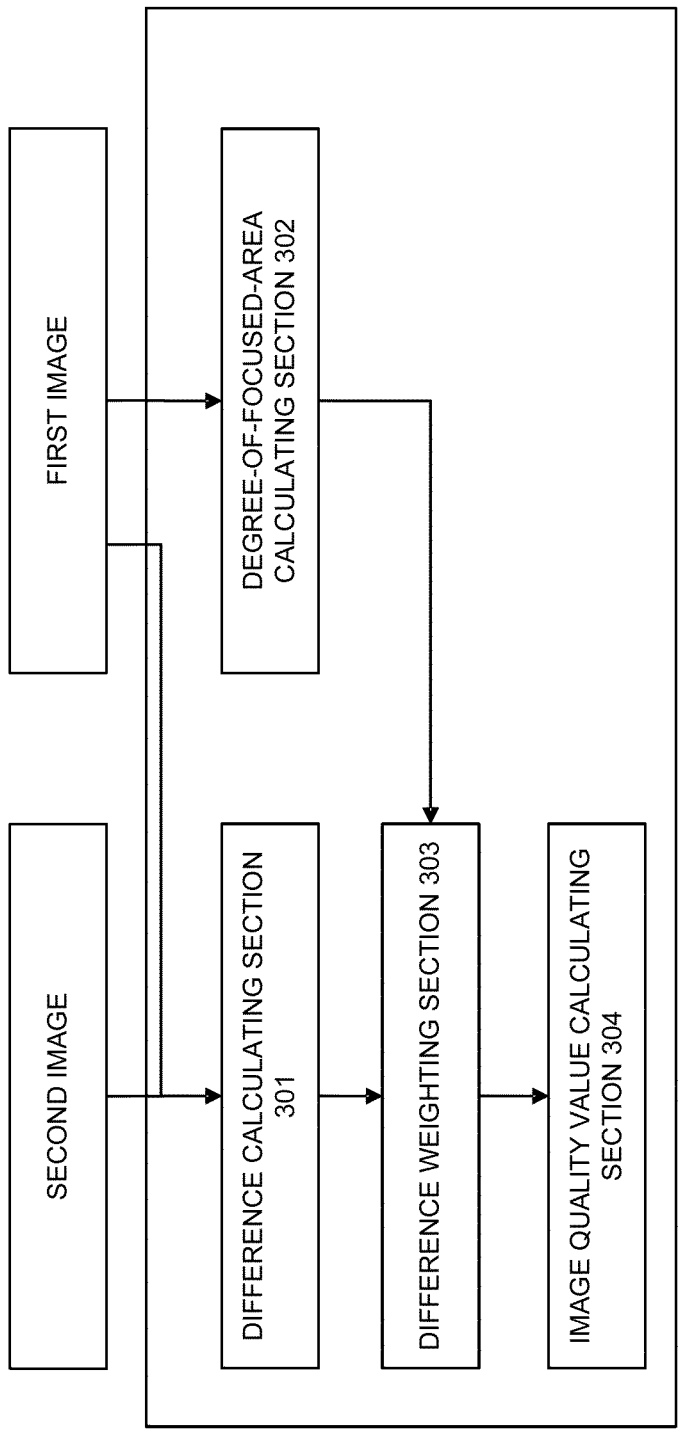
FIG. 4 is a block diagram showing a configuration of a third embodiment of the present invention.

Referring to FIG. 4, an image evaluation system in the third embodiment of the present invention is comprised of a difference calculating section 301, a degree-of-focused-area calculating section 302, a difference weighting section 303, and an image quality value calculating section 304.

The third embodiment is similar to the first embodiment except that in calculating the degree of focused area for each pixel group at the degree-of-focused-area calculating section 302, the pixel group is comprised of not one pixel but a group of a plurality of pixels and the focused area is identified on a pixel group-by-pixel group (block-by-block) basis. This embodiment addresses a case in which the difference calculating section 301 is also supplied with data representing a feature for the first image and that representing a feature for the second image for each pixel group that is the same as the pixel group described above. Other components are similar to those in the first embodiment, and accordingly, explanation thereof will be omitted.

The difference calculating section 301 is supplied as input with the data representing a feature for the first image and that representing a feature for the second image. For example, in a case that an average of pixel values within a pixel group is input, an absolute value of a difference between the average of pixel values within the pixel group at a position in a frame in the first image and that within the pixel group at the same position and in a frame at the same time as those of the first image, in the second image is calculated as the differential value.

The degree-of-focused-area calculating section 302 is supplied with pixel values of at least part of pixels in the first image, as in the first embodiment, and decides whether each input pixel is a pixel of interest. The method of decision is similar to that in the first embodiment, and accordingly, explanation thereof will be omitted.

Next, based on a result of the decision as to whether each pixel is a pixel of interest, a degree of focused area is calculated and output for each pixel group, which is a group of a plurality of pixels.

As an example, a method of calculating a degree of focused area when a pixel group is a block of 16 by 16 pixels will be described. First, the number of pixels decided to be a pixel of interest is accumulated within the pixel group. Then, a calculation is made such that in a case that the number of pixels is equal to or greater than a predefined threshold (for example, 128), the degree of focused area for the pixel group is defined as one; otherwise, as zero. Besides, the degree of focused area may be defined such that (degree of focused area)=(the number of pixels decided to be a pixel of interest)/(the number of pixels within the pixel group). For example, in a case that the number of pixels decided to be a pixel of interest is thirty, the degree of focused area for that pixel group is 30/(16×16).

In addition to accumulating the number of pixels decided to be a pixel of interest within a pixel group of interest for decision, the number of pixels decided to be a pixel of interest may be accumulated in an extent also including pixel groups near the pixel group. This is done by taking account of the fact that while a person watches an image, pixel groups near the pixel group come into sight. Moreover, from a similar reason, pixel groups having a degree of focused area of zero lying near a pixel group having a degree of focused area of non-zero may be modified to have a degree of focused area of non-zero.

Figure 5:
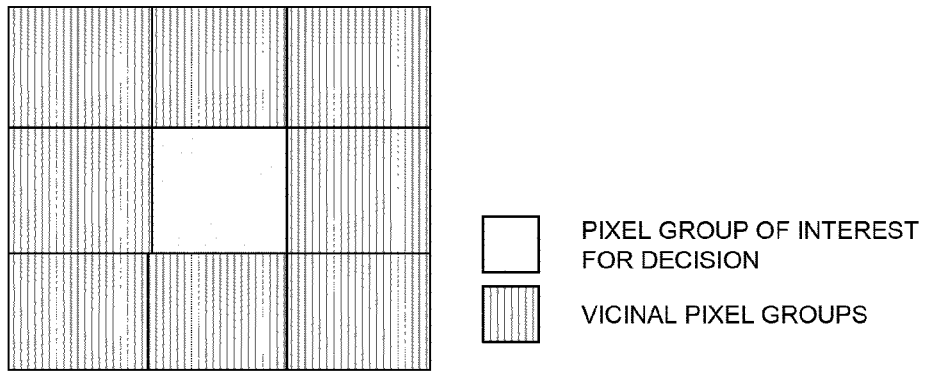
FIG. 5 is a diagram for explaining a pixel area examined to detect a focused area in the third embodiment of the present invention.

As an example, a case in which a pixel group is a block of 16 by 16 pixels and a range shown in FIG. 5 represents vicinal pixel groups will now be described.

In calculating a degree of focused area for a pixel group of interest for decision, the number of pixels decided to be a pixel of interest is accumulated in an extent including the pixel group of interest for decision and vicinal pixel groups together (a block of 48 by 48 pixels). In a case that the number of pixels decided to be a pixel of interest is 55, the degree of focused area for the pixel group of interest for decision is 55/(48×48). It should be noted that the method of calculating a degree of focused area is not limited to that described above, and various methods may be contemplated, including a method of applying weighting depending upon whether a pixel group is a pixel group of interest for decision or a vicinal pixel group.

In this embodiment, a value having a higher correlation with the degree of actual focusing by a person can be calculated by identifying a focused area for each pixel group that is a group of a plurality of pixels, and calculating a degree of focused area for the image group. This is because pixels of interest covering an extent having a certain size are focused more than only one pixel is. For example, a person tends to focus upon an extent of a certain size (such as a whole face) of pixels having a pixel value that resembles a human skin color, rather than upon one pixel having a pixel value that resembles a human skin color.

In defining a pixel group, a mode in which a component such as an object recognizing section is provided to apply object recognition to an image beforehand and define each object as a pixel group may be contemplated. By calculating a degree of focused area on an object-by-object basis, it is possible to calculate a degree of focused area more accurately.

Fourth Embodiment

Next, a fourth embodiment in the present invention will be described with reference to FIG. 6. In the fourth embodiment, the moving picture processing apparatus described earlier regarding the first embodiment is implemented by a computer system.

Figure 6:
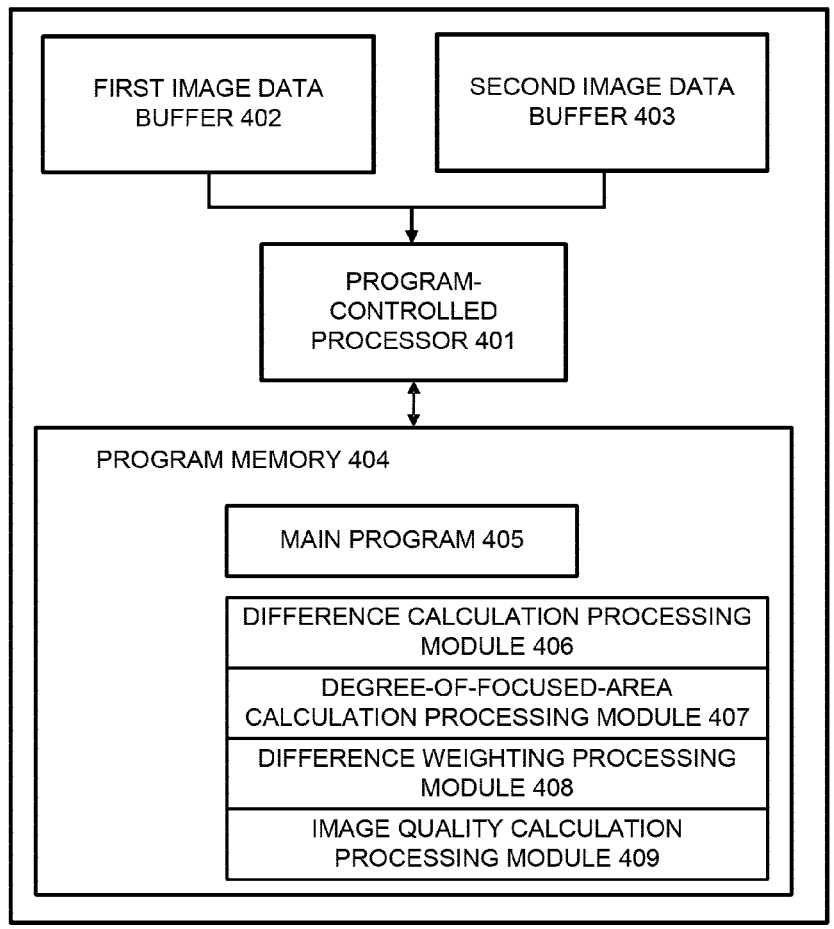
FIG. 6 is a block diagram showing a computer system, which is a fourth embodiment of the present invention.

Referring to FIG. 6, the present system is provided with a program-controlled processor 401. The program-controlled processor 401 is connected with a first image data buffer 402 and a second image data buffer 403, as well as a program memory 404 for storing therein required programs. Program modules stored in the program memory 404 comprise a main program 405, as well as those for a difference calculation processing module 406, a degree-of-focused-area calculation processing module 407, a difference weighting processing module 408, and an image quality calculation processing module 409. The main program 405 is a principal program for executing the image quality evaluation processing. The program modules for the difference calculating processing module 406, degree-of-focused-area calculation processing module 407, difference weighting processing module 408, and image quality calculation processing module 409 are processing modules for implementing the functions of the difference calculating section 101, degree-of-focused-area calculating section 102, difference weighting section 103, and image quality value calculating section 104 described above, respectively.

Example 1

An example of the present invention will now be described.

The present invention is a specific example of the first embodiment.

In this example, the second image, which is an original image, is a moving picture of an SDTV size (720 pixels in a horizontal direction, 480 pixels in a vertical direction, and 29.97 frames per second). The first image, which is an image of interest for evaluation, is a moving picture obtained by encoding the moving picture in an MPEG-2 format at 4 Mbps and decoding the encoded image.

Figure 7:
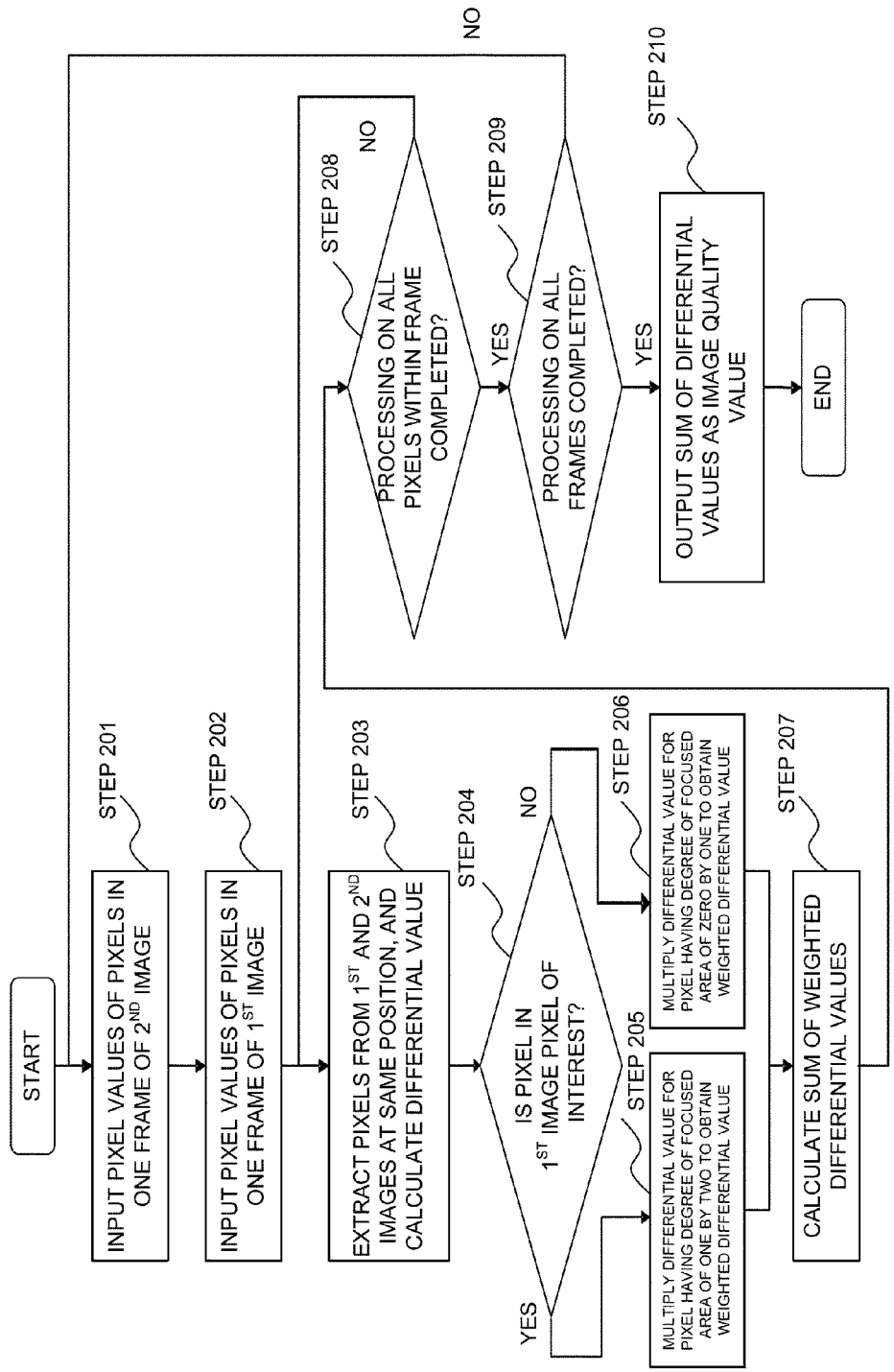
FIG. 7 is a flow chart for explaining an operation in an example of the present invention.

FIG. 7 is a flow chart illustrating an operation of this example.

At Step 201, one frame of image data for a second image is input to the difference calculating section 201. At Step 202, one frame of image data for a first image at the same time as that of the frame of image data for the second image is input to the difference calculating section 201. At Step 203, the difference calculating section 201 extracts pixel values of the image data for these images at the same position, and calculates an absolute difference between the pixel values as a differential value. Assuming that the luminance value Y is 50 at a certain position in the second image and 52 in the first image, the differential value is 2.

At Step 204, the degree-of-focused-area calculating section 102 decides whether the current pixel is a pixel of interest from the pixel value for the first image extracted at Step 203. In a case that it is a pixel of interest, the degree of focused area for that pixel is defined as one; otherwise, as zero. In particular, in a case that the pixel value falls within a range of a luminance Y ranging $48<Y<224$, a blue difference Cb ranging $104<Cb<125$, and a red difference Cr ranging $135<Cr<171$, the pixel value is decided to be a pixel of interest. For example, in a case that the first image has a luminance value Y of 52, a blue difference Cb of 110, and a red difference Cr of 150, the values fall within the range described above, so that the pixel is decided to be a pixel of interest and is given a degree of focused area of one.

In a case that the degree of focused area is one for the pixel, the difference weighting section 103 multiplies the differential value corresponding to the pixel by two, and defines the resulting value as a weighted differential value at Step 205. In a case that the degree of focused area is zero for the pixel, the difference weighting section 103 multiplies the differential value by one, and defines the resulting value as a weighted differential value at Step 206.

At Step 207, to determine a total value of weighted differential values for the whole image, the weighted differential value is added to a variable Sum. The initial value of the variable Sum is zero.

At Step 208, a check is made as to whether the difference calculation is completed for all pixels in one frame. In a case that the calculation is not completed, the process goes back to Step 203 and similar processing is applied to a pixel for which the difference calculation is not completed yet.

In a case that the calculation is completed, a check is made as to whether the processing is completed for all frames in the first image at Step 209. In a case that the processing is not completed, the process goes back to Step 201 and similar processing is applied to a subsequent frame. In a case that the processing is completed, the image quality value calculating section 104 outputs the total value Sum of the weighted differential values for the whole image as an image quality value at Step 210. By this operation, the processing is terminated.

The 1st mode of the present invention is characterized in that an image quality evaluation system comprising: a difference calculating section for calculating a difference between data representing a feature of a pixel group comprised of at least one pixel making up a first image, and data representing a feature of a pixel group comprised of at least one pixel making up a second image; a degree-of-focused-area calculating section for deciding a focused area in the image having a predetermined feature using at least one of said first and second images, and calculating a degree of focused area indicating the degree of being said focused area; a difference weighting section for applying weighting to the difference in feature for a pixel group falling within said focused area based on said degree of focused area; and an image quality value calculating section for calculating an image quality value for said first image based on the difference weighted by said difference weighting section.

The 2nd mode of the present invention, in the above-mentioned modes, is characterized in that said degree-of-focused-area calculating section performs decision of a focused area on a pixel group-by-pixel group basis.

The 3rd mode of the present invention, in the above-mentioned modes, is characterized in that said degree-of-focused-area calculating section decides whether a pixel is a pixel of interest for said focused area based on at least a pixel value of said pixel making up said first or second image, and decides a focused area comprised of at least one or more pixels based on said pixel of interest.

The 4th mode of the present invention, in the above-mentioned modes, is characterized in that said degree-of-focused-area calculating section decides a pixel as a pixel of interest in a case that a pixel value of said pixel falls within a specific range in a color space.

The 5th mode of the present invention, in the above-mentioned modes, is characterized in that said specific range in said color space is a predetermined range defined by a YCbCr color space represented by a luminance value and a color difference value.

The 6th mode of the present invention, in the above-mentioned modes, is characterized in that said specific range in said color space is a range with a value Y indicating the luminance ranging $48 \leq y \leq 224$, a value Cb indicating the blue difference ranging $104<Cb<125$, and a value Cr indicating the red difference ranging $135<Cr<171$.

The 7th mode of the present invention, in the above-mentioned modes, is characterized in that said specific range in said color space is a predetermined range defined in an RGB color space represented by RGB values indicating three primary colors, red, blue and green.

The 8th mode of the present invention, in the above-mentioned modes, is characterized in that said degree-of-focused-area calculating section calculates a degree of focused area for a pixel group of pixels decided to be said pixel of interest as one and that for a pixel group of pixels decided not to be said pixel of interest as zero.

The 9th mode of the present invention, in the above-mentioned modes, is characterized in that said degree-of-focused-area calculating section accumulates the number of pixels decided to be said pixel of interest among pixels within said pixel group, and calculates a degree of focused area for said pixel group based on a result of said accumulation.

The 10th mode of the present invention, in the above-mentioned modes, is characterized in that said degree-of-focused-area calculating section accumulates the number of pixels decided to be a pixel of interest among pixels within said pixel group and the number of pixels decided to be a pixel of interest among pixels near said pixel group, and calculates a degree of focused area for said pixel group based on a result of the accumulation.

The 11th mode of the present invention, in the above-mentioned modes, is characterized in that said data representing a feature for the first image and that representing a feature for the second image are information on any one of a luminance value, a color difference value and an RGB value, or a combination thereof, for at least part of pixels making up said first and second images.

The 12th mode of the present invention, in the above-mentioned modes, is characterized in that said data representing a feature for the first image and that representing a feature for the second image are an average of information on any one of a luminance value, a color difference value and an RGB value, or a combination thereof, for pixels contained in at least part of pixel groups making up said first and second images.

The 13th mode of the present invention, in the above-mentioned modes, is characterized in that said data representing a feature for the first image and that representing a feature for the second image are an average of absolute differences within an image group between an average of information on any one of a luminance value, a color difference value and an RGB value, or a combination thereof, and said information for each pixel within said pixel group, for pixels contained in at least part of pixel groups making up said first and second images.

The 14th mode of the present invention, in the above-mentioned modes, is characterized in that said data representing a feature for the first image and that representing a feature for the second image are a variance of information on any one of a luminance value, a color difference value and an RGB value, or a combination thereof, for pixels contained in at least part of pixel groups making up said first and second images.

The 15th mode of the present invention is characterized in that an image quality evaluation method comprising: calculating a difference between data representing a feature of a pixel group comprised of at least one pixel making up a first image, and data representing a feature of a pixel group comprised of at least one pixel making up a second image; deciding a focused area in the image having a predetermined feature using at least one of said first and second images, and calculating a degree of focused area indicating the degree of being said focused area; applying weighting to the difference in feature for a pixel group falling within said focused area based on said degree of focused area; and calculating an image quality value for said first image based on said weighted difference.

The 16th mode of the present invention, in the above-mentioned modes, is characterized in that decision of said focused area is performed on a pixel group-by-pixel group basis.

The 17th mode of the present invention, in the above-mentioned modes, is characterized in that the image quality evaluation method comprising deciding whether a pixel is a pixel of interest for said focused area based on at least a pixel value of said pixel making up said first or second image; and deciding a focused area comprised of at least one or more pixels based on said pixel of interest.

The 18th mode of the present invention, in the above-mentioned modes, is characterized in that the image quality evaluation method comprising deciding a pixel as a pixel of interest in a case that the pixel value of said pixel falls within a specific range in a color space.

The 19th mode of the present invention, in the above-mentioned modes, is characterized in that said specific range in said color space is a predetermined range defined by a YCbCr color space represented by a luminance value and a color difference value.

The 20th mode of the present invention, in the above-mentioned modes, is characterized in that said specific range in said color space is a range with a value Y indicating the luminance ranging $48 \leq y \leq 224$, a value Cb indicating the blue difference ranging $104 < Cb < 125$, and a value Cr indicating the red difference ranging $135 < Cr < 171$.

The 21st mode of the present invention, in the above-mentioned modes, is characterized in that said specific range in said color space is a predetermined range defined in an RGB color space represented by RGB values indicating three primary colors, red, blue and green.

The 22nd mode of the present invention, in the above-mentioned modes, is characterized in that the image quality evaluation method comprising: calculating a degree of focused area for a pixel group of pixels decided to be said pixel of interest as one and that for a pixel group of pixels decided not to be said pixel of interest as zero.

The 23rd mode of the present invention, in the above-mentioned modes, is characterized in that the image quality evaluation method comprising: accumulating the number of pixels decided to be said pixel of interest among pixels within a pixel group; and calculating a degree of focused area for said pixel group based on a result of said accumulation.

The 24th mode of the present invention, in the above-mentioned modes, is characterized in that the image quality evaluation method comprising: accumulating the number of pixels decided to be a pixel of interest among pixels within a pixel group and the number of pixels decided to be a pixel of interest among pixels near said pixel group; and calculating a degree of focused area for said pixel group based on a result of the accumulation.

The 25th mode of the present invention, in the above-mentioned modes, is characterized in that said data representing a feature for the first image and that representing a feature for the second image are information on any one of a luminance value, a color difference value and an RGB value, or a combination thereof, for at least part of pixels making up said first and second images.

The 26th mode of the present invention, in the above-mentioned modes, is characterized in that said data representing a feature for the first image and that representing a feature for the second image are an average of information on any one of a luminance value, a color difference value and an RGB value, or a combination thereof, for pixels contained in at least part of pixel groups making up said first and second images.

The 27th mode of the present invention, in the above-mentioned modes, is characterized in that said data representing a feature for the first image and that representing a feature for the second image are an average of absolute differences within an image group between an average of information on any one of a luminance value, a color difference value and an RGB value, or a combination thereof, and said information for each pixel within said pixel group, for pixels contained in at least part of pixel groups making up said first and second images.

The 28th mode of the present invention, in the above-mentioned modes, is characterized in that said data representing a feature for the first image and that representing a feature for the second image are a variance of information on any one of a luminance value, a color difference value and an RGB value, or a combination thereof, for pixels contained in at least part of pixel groups making up said first and second images.

The 29th mode of the present invention is characterized in that a program causing an information processing apparatus to execute the processing of: calculating a difference between data representing a feature of a pixel group comprised of at least one pixel making up a first image, and data representing a feature of a pixel group comprised of at least one pixel making up a second image; deciding a focused area in the image having a predetermined feature using at least one of said first and second images, and calculating a degree of focused area indicating the degree of being said focused area; applying weighting to the difference in feature for a pixel group falling within said focused area based on said degree of focused area; and calculating an image quality value for said first image based on said weighted difference.

Above, although the present invention has been particularly described with reference to the preferred embodiments and modes thereof, it should be readily apparent to those of ordinary skill in the art that the present invention is not always limited to the above-mentioned embodiment and modes, and changes and modifications in the form and details may be made without departing from the sprit and scope of the invention.

This application is based upon and claims the benefit of priority from Japanese patent application No. 2008-118349, filed on Apr. 30, 2008, the disclosure of which is incorporated herein in its entirety by reference.

The invention claimed is:

1. An image quality evaluation system comprising:
   a difference calculator that calculates a difference between data representing a feature of a pixel group comprised of at least one pixel making up a first image, and data representing a feature of a pixel group comprised of at least one pixel making up a second image;
   a degree-of-focused-area calculator that sums up a number of the pixels decided to be a pixel of interest falling within a specific range in a color space, out of the pixels of said pixel group and a vicinal pixel group in a vicinity of said pixel group of at least one of said first and second images, and calculates a degree of focused area indicating the degree of being a focused area of said pixel group using a sum-up result;
   a difference weighting section that applies weighting to the difference in feature for said pixel group based on said degree of focused area; and
   an image quality value calculator that calculates an image quality value for said first image based on the difference weighted by said difference weighting section.

2. The image quality evaluation system according to claim 1, wherein said degree-of-focused-area calculator performs decision of a focused area on a pixel group-by-pixel group basis.

3. The image quality evaluation system according to claim 1, wherein said specific range in said color space is a predetermined range defined by a YCbCr color space represented by a luminance value and a color difference value.

4. The image quality evaluation system according to claim 1, wherein said specific range in said color space is a range with a value Y indicating the luminance ranging $48<Y<224$, a value Cb indicating the blue difference ranging $104<Cb<125$, and a value Cr indicating the red difference ranging $135<Cr<171$.

5. The image quality evaluation system according to claim 1, wherein said specific range in said color space is a predetermined range defined in an RGB color space represented by RGB values indicating three primary colors, red, blue and green.

6. The image quality evaluation system according to claim 1, wherein said degree-of-focused-area calculator calculates the degree of focused area based on a ratio between a number of the pixels decided to be said pixel of interest and a number of the pixels of said pixel group and a vicinal pixel group in a vicinity of said pixel group.

7. The image quality evaluation system according to claim 1, wherein said data representing a feature for the first image and said data representing a feature for the second image are information on any one of a luminance value, a color difference value and an RGB value, or a combination thereof, for at least part of pixels making up said first and second images.

8. The image quality evaluation system according to claim 1, wherein said data representing a feature for the first image and said data representing a feature for the second image are an average of information on any one of a luminance value, a color difference value and an RGB value, or a combination thereof, for pixels contained in at least part of pixel groups making up said first and second images.

9. The image quality evaluation system according to claim 1, wherein said data representing a feature for the first image and said data representing a feature for the second image are an average of absolute differences within an image group between an average of information on any one of a luminance value, a color difference value and an RGB value, or a combination thereof, and said information for each pixel within said pixel group, for pixels contained in at least part of pixel groups making up said first and second images.

10. The image quality evaluation system according to claim 1, wherein said data representing a feature for the first image and said data representing a feature for the second image are a variance of information on any one of a luminance value, a color difference value and an RGB value, or a combination thereof, for pixels contained in at least part of pixel groups making up said first and second images.

11. An image quality evaluation method comprising:
    calculating a difference between data representing a feature of a pixel group comprised of at least one pixel making up a first image, and data representing a feature of a pixel group comprised of at least one pixel making up a second image;
    summing up a number of the pixels decided to be a pixel of interest falling within a specific range in a color space, out of the pixels of said pixel group and a vicinal pixel group in a vicinity of said pixel group of at least one of said first and second images, and calculating a degree of focused area indicating the degree of being a focused area of said pixel group using a sum-up result;
    applying weighting to the difference in feature for said pixel group based on said degree of focused area; and
    calculating an image quality value for said first image based on said weighted difference.

12. The image quality evaluation method according to claim 11, wherein decision of said focused area is performed on a pixel group-by-pixel group basis.

13. The image quality evaluation method according to claim 11, wherein said specific range in said color space is a predetermined range defined by a YCbCr color space represented by a luminance value and a color difference value.

14. The image quality evaluation method according to claim 11, wherein said specific range in said color space is a range with a value Y indicating the luminance ranging $48<Y<224$, a value Cb indicating the blue difference ranging $104<Cb<125$, and a value Cr indicating the red difference ranging $135<Cr<171$.

15. The image quality evaluation method according to claim 11, wherein said specific range in said color space is a predetermined range defined in an RGB color space represented by RGB values indicating three primary colors, red, blue and green.

16. The image quality evaluation method according to claim 11, comprising calculating the degree of focused area based on a ratio between a number of the pixels decided to be said pixel of interest and a number of the pixels of said pixel group and a vicinal pixel group in a vicinity of said pixel group.

17. The image quality evaluation method according to claim 11, wherein said data representing a feature for the first image and said data representing a feature for the second image are information on any one of a luminance value, a color difference value and an RGB value, or a combination thereof, for at least part of pixels making up said first and second images.

18. The image quality evaluation method according to claim 11, wherein said data representing a feature for the first image and said data representing a feature for the second image are an average of information on any one of a luminance value, a color difference value and an RGB value, or a combination thereof, for pixels contained in at least part of pixel groups making up said first and second images.

19. The image quality evaluation method according to claim 11, wherein said data representing a feature for the first image and said data representing a feature for the second image are an average of absolute differences within an image group between an average of information on any one of a luminance value, a color difference value and an RGB value, or a combination thereof, and said information for each pixel within said pixel group, for pixels contained in at least part of pixel groups making up said first and second images.

20. The image quality evaluation method according to claim 11, wherein said data representing a feature for the first image and said data representing a feature for the second image are a variance of information on any one of a luminance value, a color difference value and an RGB value, or a combination thereof, for pixels contained in at least part of pixel groups making up said first and second images.

21. A non-transitory computer readable storage medium storing a program causing an information processing apparatus to execute the processing of:
    calculating a difference between data representing a feature of a pixel group comprised of at least one pixel making up a first image, and data representing a feature of a pixel group comprised of at least one pixel making up a second image;
    summing up a number of the pixels decided to be a pixel of interest falling within a specific range in a color space, out of the pixels of said pixel group and a vicinal pixel group in a vicinity of said pixel group of at least one of said first and second images, and calculating a degree of focused area indicating the degree of being a focused area of a said pixel group using a sum-up result;
    applying weighting to the difference in feature for said pixel group based on said degree of focused area; and
    calculating an image quality value for said first image based on said weighted difference.

22. An image quality evaluation method comprising:
    calculating a difference between data representing a feature of a pixel group comprised of at least one pixel making up a first image, and data representing a feature of a pixel group comprised of at least one pixel making up a second image;
    summing up a number of the pixels decided to be a pixel falling within a specific range in a color space, out of the pixels of said pixel group and a vicinal pixel group in a vicinity of said pixel group, on a pixel group-by-pixel group basis using at least one of said first and second images, and deciding said pixel group as a focused area in the image having a predetermined feature when said number of the pixels is equal to or greater than a predefined threshold; and
    applying weighting to the difference in feature for said pixel group decided to be the focused area.

23. The image quality evaluation method according to claim 22, wherein the specific range in said color space is a predetermined range defined by a YCbCr color space represented by a luminance value and a color difference value.

24. The image quality evaluation method according to claim 22, wherein the specific range in said color space is a range with a value Y indicating luminance ranging $48<Y<224$, a value Cb indicating a blue difference ranging $104<Cb<125$, and a value Cr indicating a red difference ranging $135<Cr<171$.

* * * * *

UNITED STATES PATENT AND TRADEMARK OFFICE
CERTIFICATE OF CORRECTION

| | |
|---|---|
| PATENT NO. | : 8,503,822 B2 |
| APPLICATION NO. | : 12/922817 |
| DATED | : August 6, 2013 |
| INVENTOR(S) | : Toru Yamada |

It is certified that error appears in the above-identified patent and that said Letters Patent is hereby corrected as shown below:

In the Specification

Column 10, Line 64: Delete "201." and insert -- 101. --

Column 10, Line 67: Delete "201." and insert -- 101. --

Column 11, Line 1: Delete "201" and insert -- 101 --

Signed and Sealed this
Eleventh Day of November, 2014

Michelle K. Lee
*Deputy Director of the United States Patent and Trademark Office*